US 6,982,817 B1

(12) United States Patent
Halldorsson

(10) Patent No.: US 6,982,817 B1
(45) Date of Patent: Jan. 3, 2006

(54) METHOD, DEVICE AND LASER SYSTEM FOR PRODUCING SCREEN HOLOGRAMS, AND SCREEN HOLOGRAM

(75) Inventor: Thorsteinn Halldorsson, Munich (DE)

(73) Assignee: EADS Deutschland GmbH, Munich (DE)

( * ) Notice: Subject to any disclaimer, the term of this patent is extended or adjusted under 35 U.S.C. 154(b) by 33 days.

(21) Appl. No.: 10/031,438

(22) PCT Filed: Jul. 6, 2000

(86) PCT No.: PCT/DE00/02220

§ 371 (c)(1),
(2), (4) Date: May 23, 2002

(87) PCT Pub. No.: WO01/07942

PCT Pub. Date: Feb. 1, 2001

(30) Foreign Application Priority Data

Jul. 21, 1999 (DE) .................................. 199 34 162

(51) Int. Cl.
*G03H 1/26* (2006.01)
(52) U.S. Cl. ............................. 359/22; 359/35; 359/28
(58) Field of Classification Search ................. 359/35, 359/22, 10, 11, 27; 348/40, 41
See application file for complete search history.

(56) References Cited

U.S. PATENT DOCUMENTS

| | | | | |
|---|---|---|---|---|
| 3,632,181 A | * | 1/1972 | Lee .............................. | 359/26 |
| 4,338,578 A | * | 7/1982 | Sukhman ..................... | 372/23 |
| 4,456,328 A | * | 6/1984 | Arns et al. ................... | 359/10 |
| 4,500,163 A | | 2/1985 | Burns et al. .................. | 359/15 |
| 4,586,780 A | * | 5/1986 | Chern et al. ................. | 359/294 |
| 4,863,225 A | | 9/1989 | Howard ........................ | 359/8 |
| 5,138,471 A | * | 8/1992 | McGrew ...................... | 359/21 |
| 5,926,294 A | | 7/1999 | Sato et al. .................... | 359/22 |
| 6,392,766 B1 | * | 5/2002 | Gnaedig et al. ............. | 359/15 |

FOREIGN PATENT DOCUMENTS

| | | |
|---|---|---|
| DE | 40 38 308 A1 | 11/1990 |
| DE | 44 32 029 A1 | 9/1994 |
| DE | 195 04 047 C1 | 2/1995 |
| DE | 197 00 162 A1 | 1/1997 |
| DE | 197 03 592 A1 | 1/1997 |
| EP | 0 499 372 A2 | 1/1992 |
| WO | WO 99/39510 | 8/1999 |

OTHER PUBLICATIONS

P. Hariharan, 'Optical holography: Principles, techniques, and applications', Cambridge University Press, Cambridge, 1996, pp. 69-84, 181-184.*
PCT International Search Report and translation of relevant text.

* cited by examiner

Primary Examiner—Thong Nguyen
Assistant Examiner—Arnel C. Lavarias
(74) Attorney, Agent, or Firm—Crowell & Moring LLP

(57) ABSTRACT

In a method of producing video screen holograms, a real video screen is illuminated by means of a narrowband light for producing a hologram of the real video screen. A plurality of individual recordings is carried out, each covering only a partial area of the real video screen being imaged in the hologram. The individual recordings take place, for example, by means of a scanning pulsed laser beam. The individual recordings are assembled to form the video screen hologram of the entire video screen. A recording device for this purpose comprises a scanning device for guiding the light radiation over the video screen and a light source which generates pulsed light radiation. The light source is, for example, a laser system with a pulsed q-switched oscillator and with an optical parametric oscillator.

17 Claims, 5 Drawing Sheets

METHOD, DEVICE AND LASER SYSTEM FOR PRODUCING SCREEN HOLOGRAMS, AND SCREEN HOLOGRAM

BACKGROUND AND SUMMARY OF THE INVENTION

This application claims the priority of German patent document 199 34 162. 1, filed 21 Jul. 1999 and PCT International Application No. PCT/DE00/02220, filed 6 Jul. 2000, the disclosure of which is expressly incorporated by reference herein.

The invention relates to a method and apparatus system for producing video screen holograms, and to a video screen hologram.

Video screen holograms, which are produced as holographic images of real white video screens or video projection screens and are recorded by means of lasers in the primary colors red, green and blue (rgb), have the advantage that they are effective only within a narrow spectral range about the recording wavelength, and at the same time only within a very limited projection angle about the direction of incidence of the reference beam during the preceding hologram recording. The method of operation of such screens or holographic video screens is described in detail in German Patent Applications No. 19700162.9 and No. 19703592.2.

As the light sources for the projection, rgb lasers in the continuous wave mode and in the pulsed mode as well as rgb light-emitting diodes can mainly be used. The image build-up can optionally be implemented by the serial scanning of a collimated laser beam or by the imaging of an image modulator in the expanded beam of a laser or a light-emitting diode onto the screen. Holographic video screens can be produced for both front and rear projection. Because of their wavelength selectivity and directional selectivity, bright, high-contrast images of a high color fidelity can be projected onto video screen holograms even in a daylight environment. The projector with the narrowband light sources is placed at the beam origin of the divergent reference beam. Only from there will the projection light be efficiently diffracted out of the hologram toward the viewer. The diffuse broadband ambient light, for example, can traverse the video screen hologram unhindered from all other directions of incidence.

U.S. Pat. No. 4,500,163 discloses, for example, a holographic projection screen which has an arrangement of partial screen surfaces. Each partial screen surface is formed by a hologram, during whose recording a diffuser is holographically imaged as an object by means of an objective beam and a reference beam in a photo plate. This is to permit a speckle-free imaging for large-surface, semicircular projection screens.

U.S. Pat. No. 5,926,294 also shows the production of a hologram element in which a diffuser plate is holographically imaged as an objective. The hologram elements are assembled to form a projection screen.

For the reproduction or the projection of images onto video screen holograms, for example, rgb lasers are used, as described in "RBG Optical Parametric Oscillator Source", K. Snell et al., Aerosense 99, and in German Patent Documents DE 195 04 047 and DE 44 32 029.

The possible applications of video screen holograms extend over the broad field of small displays (for example, for a single person in vehicles and airplanes or at office workstations), to large-surface screens for several viewers at events. Smaller displays can be recorded by means of frequency-stable rgb continuous-wave lasers. In this case, the high requirements with respect to the stability of the laser and of the course of the beam and the connected high expenditures are disadvantageous and result in high cost.

An image representation on large video screen holograms which is independent of the ambient light would be very attractive, for example, for many different applications in the home and the office, for television, computers and electronic cinema and for projections in lecture halls, movie theaters and open-air theaters. However, the production of larger video screens, for example, of the size of typewriter paper (DIN A4) or larger, presents considerable technical difficulties.

First, the output power of the strongest continuous-wave lasers for hologram recordings is currently limited to only a few watts, which, for the particularly suitable silver halide and photo polymer materials, starting at a size of 1 $m^2$, requires a lumination time of tens of minutes. For these long lumination times, the requirements for the mechanical and thermal stability of the material, with respect to the optical components of the beam path and with respect to the frequency stability of the laser, are particularly high.

Second, during recording of the hologram, the object beam and reference beam must be expanded at the expense of the light output over the size of the video screen and of the hologram, because the radial intensity distribution is not constant over the laser beam. Rather, it follows a normal distribution which requires a considerable widening in order to achieve a lighting which is as homogeneous as possible over the surface of the holograms. When several video screen holograms are joined together to create a large video screen hologram, the intensity drop toward the edges of the individual luminated holograms is particularly disturbing because a periodic shadow pattern then runs through the entire video screen during the projection.

Third, the luminating of the three rgb colors of three lasers into the same hologram results in difficulties because a uniform luminating of all three lasers over a larger surface is difficult to achieve. Because the wavelengths of the lasers are clearly different, differences occur in the beam transmission by refraction, diffraction and scattering at different points of the entire beam path, which leads to a nonuniform color display and is difficult to eliminate in the case of an imaging over an extensive surface.

It is therefore an object of the present invention to provide a method and apparatus which can produce high-quality small and large-surface video screen holograms in a simple manner.

Another object of the invention is to create a video screen hologram which can also be implemented on a large-surface without degradation of the image quality during projection.

These and other objects and advantages are achieved by the method and apparatus for producing video screen holograms according to the invention, in which a real video screen is illuminated by means of a narrowband light to produce a hologram of the real video screen, and a large number of individual recordings are made in which only one partial area of the real video screen is illuminated. In this manner, a video screen hologram of the entire video screen is obtained by a composition and/or superimposing of the individual recordings. Because the illumination is performed by means of a scanning pulsed laser beam, it is possible to use only very brief luminating times so that disturbances during the lumination (for example, by shocks or other instabilities) are avoided. Furthermore, there is no occurrence of intensity reductions at the edge or of periodic shadow patterns, and a uniform color display becomes possible on large surfaces.

The pulse duration is, for example, dimensioned such that the movement of the laser beam over the video screen has no influence on the interference of the light waves in the hologram. The recorded partial areas of the video screen preferably correspond to the size of image pixels or are larger. In particular, the lumination can take place by means of a pulsed diode-pumped solid-state continuous-wave laser.

A frequency conversion preferably takes place in one or more of the wavelength ranges red, green, blue. For example, a contact hologram or a video screen plane hologram is produced. A transmission hologram or a reflection hologram may also be produced. Laser beams are preferably generated with a coherence length which is greater than the difference of the light paths between the object beam and the reference beam. The scanning rate and the pulse duration are, for example, coordinated with one another such that the movement of the laser beam during a pulse is less than $1/10$ of the wavelength.

Preferably, the video screen surface is scanned repeatedly by means of a respectively phase-shifted laser beam. The distribution of the lumination can be measured in order to correct the lumination during a subsequent lumination cycle. Several luminations may also be carried out by means of light rays or laser beams which are polarized perpendicular to one another in order to produce two mutually independent screen images in the hologram. Furthermore, several luminations with changed recording parameters can be carried out, for example, a changed site of the real video screen or a changed place of origin of the reference beam. The lumination preferably takes place simultaneously by means of light rays or laser beams of the primary colors red, green, blue, which are coaxially adjusted on a beam axis.

The device according to the invention for producing video screen holograms has a narrow-band light source for illuminating a real video screen. This light source is, for example, arranged such that the light emanating from the video screen is superimposed with a reference beam in order to produce a hologram of the video screen, in which case, a scanning device is provided for guiding the light radiation emanating from the light source over the video screen, the light source generating a pulsed light radiation. As a result, high-quality large-surface video screen holograms can also be produced in a simple manner.

The light source preferably simultaneously generates a red, green and blue laser radiation. The light source comprises particularly a laser system which will be described in the following.

The laser system used for producing RGB rays is suitable particularly for the generating of video screen holograms. It comprises a laser beam source for generating laser radiation, a frequency conversion device, and an optical-parametric oscillator, the laser beam source comprising a pulsed q-switched laser oscillator. By means of this laser system, large-surface video screen holograms for a color projection with a high image quality can be produced in a simple manner.

The q-switched laser oscillator is preferably a single-frequency IR oscillator. The laser beam source has, for example, a laser amplifier which is connected behind the q-switched laser oscillator. The video screen hologram according to the invention has a holographic recording material in which a real video screen is stored as a hologram, and contains a large number of individual recordings in each of which a partial area of the real video screen is imaged as a hologram, the entire image of the video screen resulting from assembled and/or superimposed individual recordings.

This results in a high-quality image reproduction, even in the case of a large-surface implementation of the video screen hologram.

The video screen hologram is preferably produced according to the method of the invention.

Other objects, advantages and novel features of the present invention will become apparent from the following detailed description of the invention when considered in conjunction with the accompanying drawings.

DETAILED DESCRIPTION OF THE DRAWINGS

Figure 2:
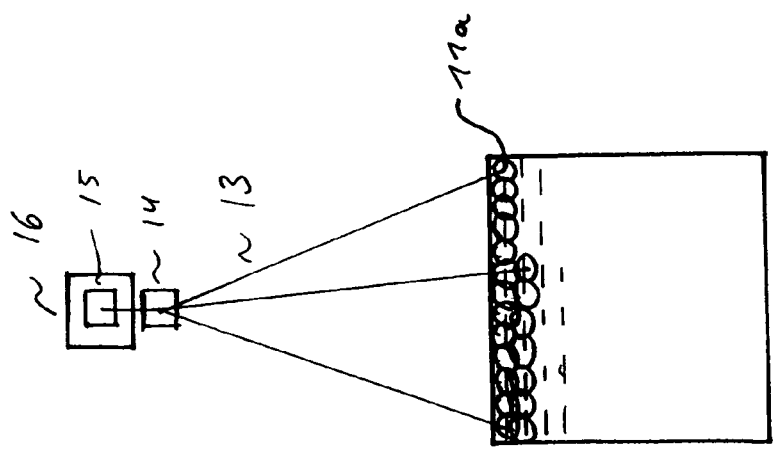
FIG. 2 is a top view of the arrangement according to FIG. 1.
Figure 1:
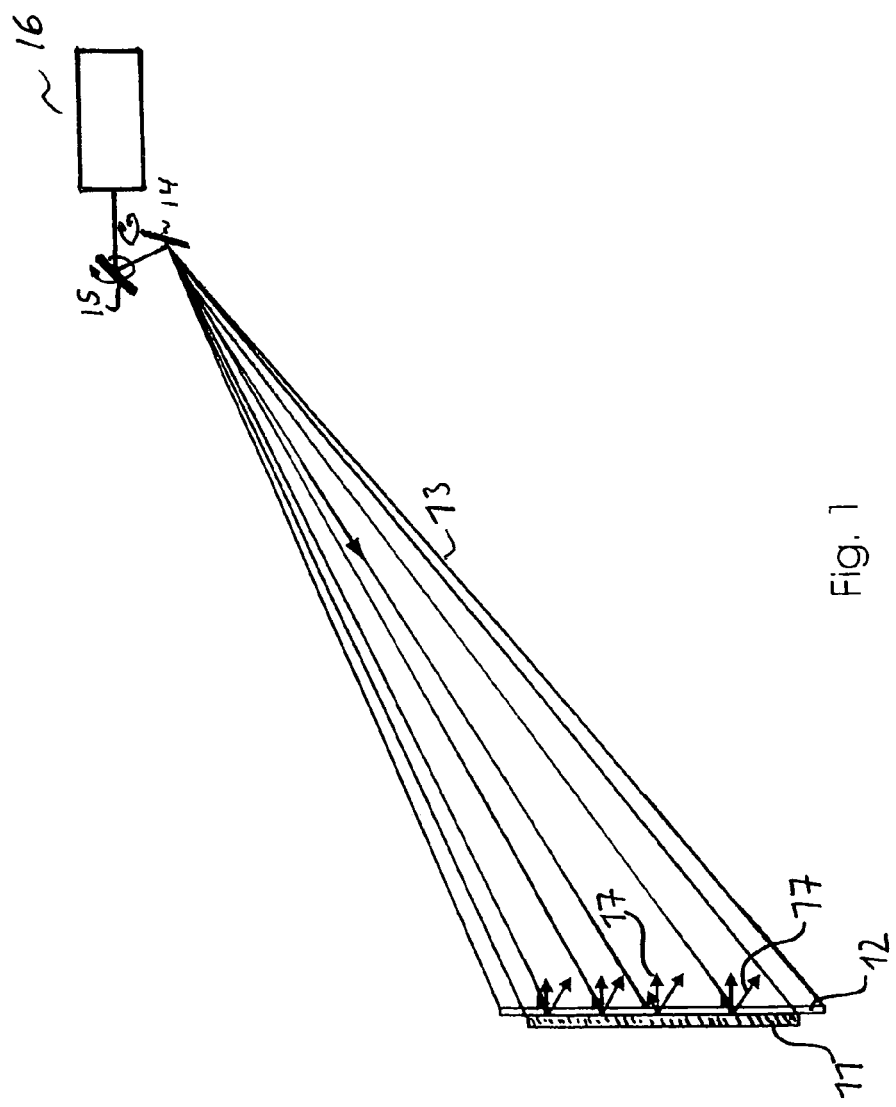
FIG. 1 is a schematic lateral view of an arrangement for recording a reflection video screen image hologram as a contact hologram.

FIG. 1 is a schematic lateral view which illustrates the recording of a reflection hologram of a video screen as a contact hologram for later front projection. A holographic recording material 12 is in contact with a video screen 11. A laser beam bundle 13 from a rapidly pulsed laser 16 is scanned by means of scanners 14 and 15 over the recording material 12 in two axis directions x and y in a surface-covering manner, for example, by means of a circular-shaped laser beam spot. FIG. 2 is a top view of the holographic recording material 12. The laser beam 13 successively illuminates a partial area 11a of the recording material 12 and of the video screen 11 situated behind the latter. Differently shaped laser spots, such as a rectangle, may also be used. A portion of the impinging laser radiation 13 is allowed by the hologram or the recording material 12 to pass through and impinges on the real video screen 11 which scatters radiation 17 as object light waves back into the hologram 12. There, the object light waves again impinge on the incident beam 13 and, together with its waves, form holographic interference patterns which are stored by the luminating process as a hologram in the recording material 12. Many different scanning techniques can be used, such as raster scans, sinusoidal scans or spiral scans.

Thus, the video screen hologram is not recorded as a whole in one piece as an image of the real video screen 11 but in a very large number of individual recordings, in each of which only small portions 11a of the real video screen 11 are illuminated. The entire image of the video screen 11 will then be obtained as a composition or superimposition of the large number of individual recordings, for example, in the manner of image pixels.

The produced video screen hologram is constructed as a contact hologram or as a so-called image plane hologram, in which the projected image when displayed appears in the hologram plane. By luminating screens in the primary colors red, green and blue into the same hologram layer 12 or into three layers laminated onto one another, colored images can later also be projected onto the holographic screen.

Contact holograms have the advantage of a simple optical construction during the recording. As illustrated in FIG. 1, the hologram is therefore placed in contact onto the real video screen 11, for example, a reflecting scattering lens or transmitting obscured glass and is luminated together with the reference beam without any additional object illuminating. During the projection, the angle of the backscattered projection light from the hologram 12 in the direction of the viewer is the same as that of the real video screen with respect to the recording light beam 13.

The invention is based on the fact that the holographic video screen or the hologram 12 must reflect the optical characteristics of the image pixels, that is, the brightness (half-tone), the color, the polarization and the angle of radiation only individually for each pixel from the screen. An optical linking between adjacent pixels does not exist, and a video screen as a contact or image plane hologram has only a two-dimensional structure. So that the hologram 12 can reflect this method of operation of a flat video screen in the hologram plane, it is not absolutely necessary to record the real video screen 11 in a single lumination over an extended hologram surface, as takes place in the case of holograms of three-dimensional objects, but the video screen may be constructed as an assembled film or a film constructed in a mosaic-type of separate individual recordings of partial areas 11a of a video screen. These partial areas 11a may therefore be reduced to the size of an individual image pixel.

The holograph video screen is recorded by luminating the real larger video screen 11 with a rapidly pulsed laser beam 13 which is scanned without gaps over the entire surface. To ensure that the movement of the beam 13 over the screen 11 or over the recording material 12 has no influence on the interference of the light waves in the hologram 12, on the one hand, the pulse duration of the laser 16 is kept sufficiently short, and on the other hand, the coherence length of the laser light is sufficient to form the interferences. In order to achieve a particularly economical production of the holographic screen, the pulse repetition frequency of the laser 16 and its median power is sufficiently high so that a short luminating time is achieved.

Suitable lasers for this type of holographic lumination are, for example, high-power, rapidly pulsed, diode-pumped infrared solid-state continuous-wave lasers with only a single longitudinal mode whose radiation is displaced by frequency conversion into the red, green and blue wavelength range. The scanning of the video screen surface can take place by means of commercially available laser beam scanners.

The partial holograms 11a are selected at least large enough that no disturbances occur, such as a reduction of contrast, color distortion and reduction of the image resolution in the later image reproduction by light diffraction or a fine structure of the holograms itself. Such disturbances are not expected if the partial holograms 11a are larger than the image pixels of the projection. On the other hand, the size and the shape of the partial hologram 11a and the scanning rate can be selected such that, by means of the defined operating parameters of the recording laser, such as the median power and the pulse repetition frequency, an optimal irradiation and a homogeneous illumination of the hologram 12 is achieved without reducing the efficiency of the recording simultaneously by the movement of the scanning beam 13.

In general, for the recording of object holograms, the object itself must be illuminated by means of an object beam and the hologram must be illuminated by means of a reference beam. The light scattered by the object is then superimposed with the reference beam in the hologram film. In the case of the pulsed recording illustrated in which only a portion 11a of the real video screen 1 is illuminated as the object and simultaneously a portion of the hologram 12 is illuminated directly by means of the pulsed reference beam 13, the luminations are implemented in a synchronously superimposed manner. This can easily be implemented by means of contact holograms, in which the hologram film 12 is placed directly on the real video screen 11 and the reference beam 13 is used both for illuminating the hologram 12 and for illuminating the video screen 11.

In the case of image plane holograms, the video screen is imaged by means of a lens into the hologram. So that the partial illumination of the video screen with the object beam and the hologram with the reference beam mutually overlap, the two scanning beams must be mutually synchronized during their movement, such that the imaged spot of the video screen in the hologram and the spot of the reference beam will in each case be congruent.

During the lumination, the light waves in the object beam and the reference beam must be coherently imposed on one another in the hologram. This means that the coherence length of the used illumination laser 16 has to be at least as large as or larger than the difference of the light paths between the waves of the object beam and the reference beam which originate from a common beam, until they meet again in the hologram 12. Within the scope of the invention, this requirement can be met by a corresponding design of the beam guidance and the build-ups of the holograms with respect to the coherence length of the available lasers.

The movement of the interfering waves in the hologram by the scanning beams (object beam and reference beam) during the pulse duration, with respect to one another and with respect to the hologram film, amounts to no more than fractions of the wavelength ($<\lambda/10$). This condition is met by a corresponding adjustment of the scanning rate corresponding to the pulse duration of the laser. In the case of a pulse duration of 10 ns and a scanning rate of 5 m/sec, the movement of the beam is, for example, 50 nm, which corresponds to approximately $\lambda/10$.

During the scanning with a pulsed radiation at a constant power from pulse to pulse, a large hologram surface can be covered with a uniform average intensity distribution. However, the lumination (that is, the light intensity times the time) depending on the ratio of the scanning rate to the pulse repetition frequency of the beam with the Gaussian intensity profile, will be periodically modulated over the whole surface along the scanning sweep. The invention therefore also provides that this periodic local non-uniformity of the illumination as well as inhomogeneities in the hologram thickness, for example, in the case of a mosaic-type laying of several holograms side-by-side, are compensated by a repeated scanning of the same surface by means of a phase-shifted scanning beam or by controlling the pulsed power. Here, the invention partly utilizes the characteristic of hologram recordings that several object luminations can be stored in an overlapping manner and independently of one another in a single hologram.

So that this lumination process can take place automatically, in one embodiment of the invention (not shown), the distribution of the lumination is monitored by a calibrated backscatter sensor which is arranged in the beam path of the illumination laser coaxially to the pulsed lumination beam.

As an alternative, monitoring cameras may continuously measure the laser illumination over the entire hologram surface. The lumination pattern thus obtained can be stored by a microprocessor or computer, and can be used during subsequent repeated scanning cycles over the entire hologram surface by controlling the laser light intensity and surface distribution of the scanning figure for the subsequent correction of the lumination of the preceding lumination patterns.

After the development process, the optical characteristics of the video screen are stored in the hologram 12. Preferably, so-called thick holograms (10–20 μm) are used, for example, consisting of photopolymer, dichromate gelatin or silver halide materials. In comparison to thin holograms, thick holograms have the advantage that they particularly selectively diffract out light with the same wavelength as during the recording, specifically only when the angle of incidence of the reconstruction beam is the same as the angle of incidence of the reference beam during the recording.

The optimal accumulated lumination of the holograms differs for each material and for each wavelength. For photopolymer materials, for example, it is at approximately 25 mJ/cm$^2$; that is, for the lumination of 1 m$^2$ with a laser 1 W of median power, 250 seconds or approximately 4 minutes are required. In the case of silver halide films, a lumination of only approximately 0.5 mJ/cm$^2$, is necessary, so that the lumination time can be correspondingly shortened. Image plane holograms are recordings of screens imaged by means of lenses or mirrors, which screens are situated in the hologram plane. The angle of radiation of these holograms can be considerably narrowed by the imaging geometry, with a corresponding increase of the brightness of the image, which is very advantageous for many applications.

Figure 3:
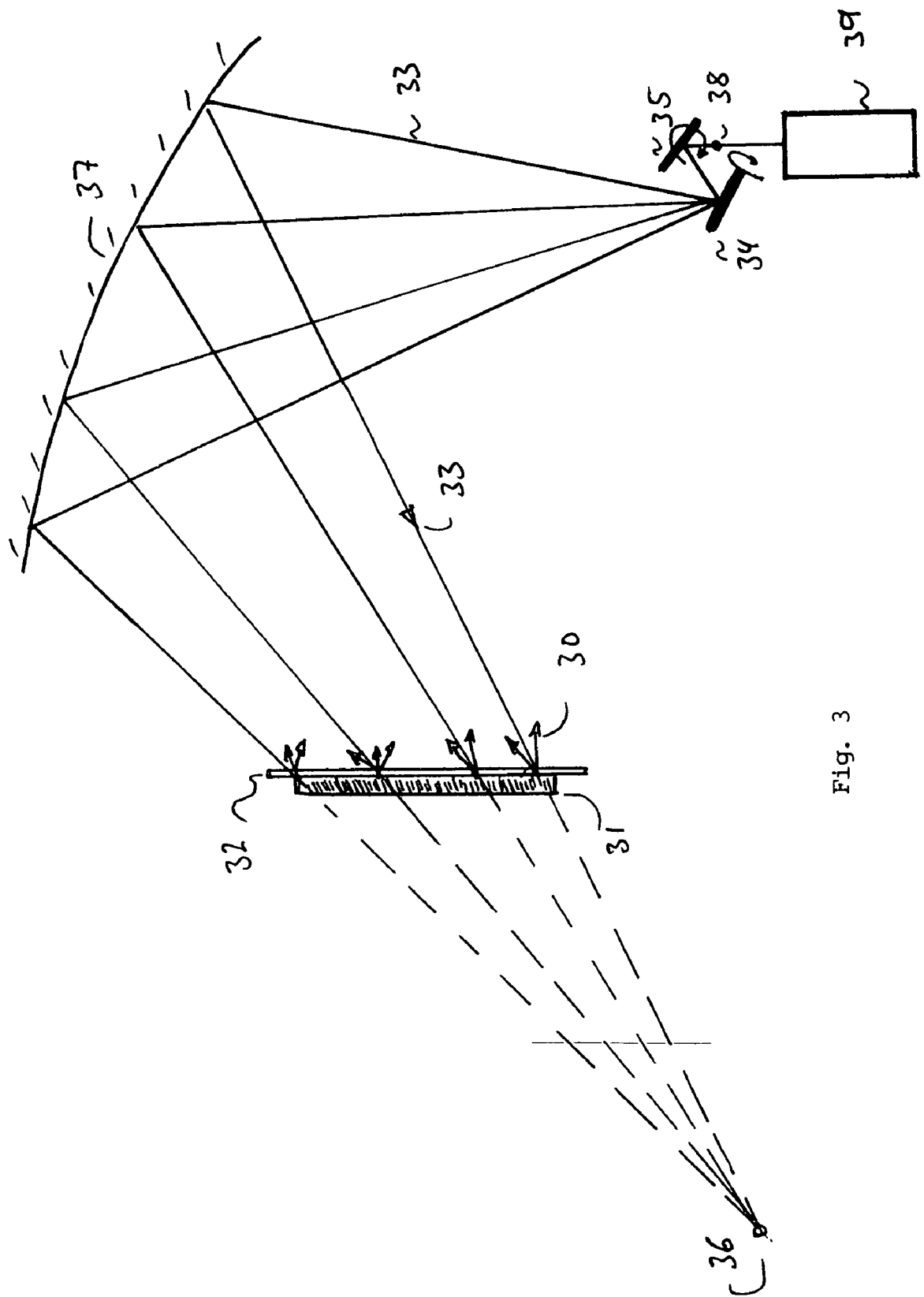
FIG. 3 is a schematic view of an arrangement for recording a transmission video screen hologram as a contact hologram.

FIG. 3 illustrates a recording of a contact hologram of a video screen 31 as a transmission hologram 32. In this case, it is necessary that a reference bundle of beams 33, whose beam path coincides with the projection beam during the later image reproduction, impinges as a convergent partial beam bundle of a pulsed laser 39 on the hologram 32. The interference structures which then form in the hologram 32 as the result of the superimposition of scattered light 30 from the screen on the reference bundle 33 of beams, will then correspond to an image reproduction in a rear projection from the intersection or projection point 36, that is, the lengthening of the beam bundle 33. During the projection, the viewer will then stand opposite the later projection point 36 on the opposite side of the hologram 12. The generating of a convergent bundle of beams from a two-axis scanner 34 and 35 can most easily be implemented by way of a mirror 37 of a long focal length which images the source point of the scanner 38 in the intersecting point 36. The hologram 32 and the real video screen 31 are then placed in a sectional plane of the beam path of the partial beam bundle 33.

Figure 4:
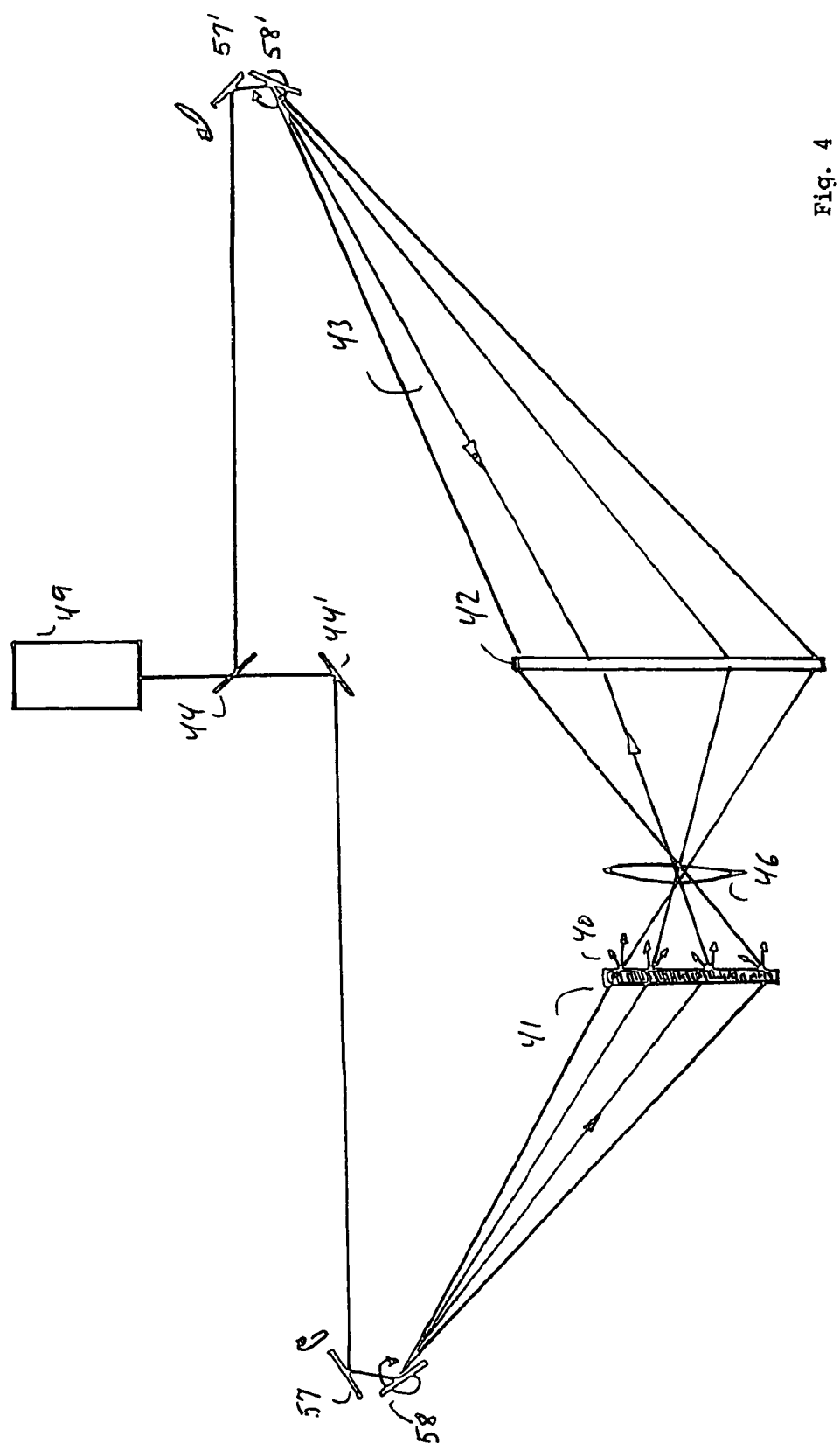
FIG. 4 is a view of an arrangement for recording a video screen reflection hologram for a front projection.

FIG. 4 illustrates a recording of a transmission hologram as an image plane hologram for the rear projection. Here, a real video screen 41 is imaged by means of a lens 46 on a hologram 42. Simultaneously, a reference beam bundle 43 impinges from the other side on the hologram 42. The two scanners with the x-y scanner mirrors 47 and 48 or 47' and 48' are synchronized such that the two illumination spots of the reference beam bundle 43 and of the illuminated surface 40 of the real screen in the hologram 41 are synchronously superimposed. The illumination beams for the real screen 42 and for the reference bundle 43 of beams are separated and deflected by means of separator mirrors 44 and deflecting mirrors 44' from the common laser 49.

Figure 5:
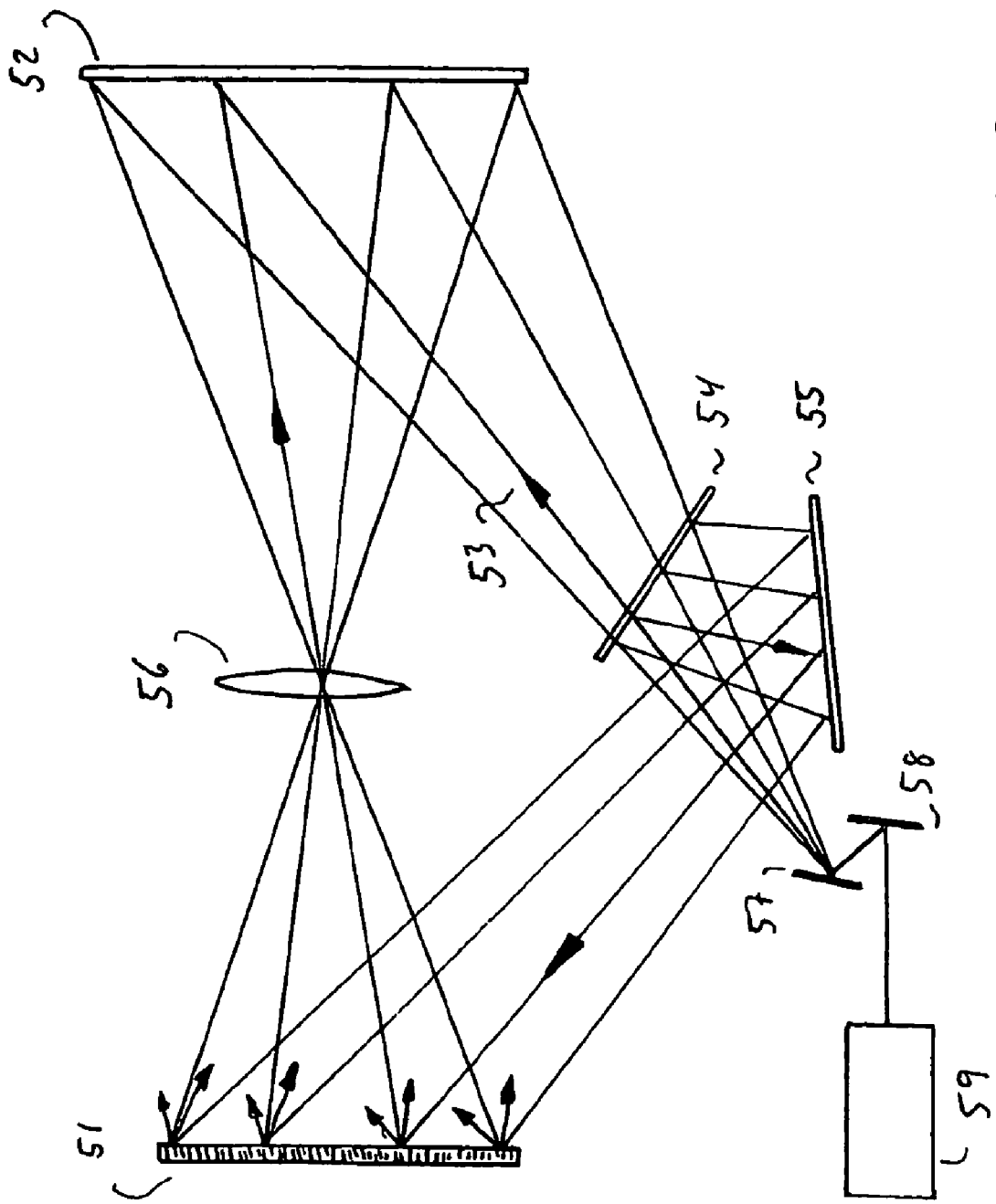
FIG. 5 is a view of an arrangement for recording a transmission video screen hologram for a rear projection as an image plane hologram.

FIG. 5 illustrates a recording of image plane hologram as a reflection hologram for the later front projection. In this case, a real screen 51 is imaged in a hologram plane 52 by means of a lens 56, and the image is synchronously superimposed there with a reference bundle 53 of beams. By means of a separator mirror 54, a portion of the reference bundle 53 of beams can be used for illuminating the real screen 51. Additional auxiliary mirrors are required for compensating the space reflection of the lens 56, which is illustrated here for the one space plane on the example of the auxiliary mirror 55. For the simultaneous scanning of the screen 51 and the hologram 52, only one pair of scanner mirrors 57 and 58 is used here in front of the pulsed laser 59.

In order to facilitate the recording of three-color or multicolor screens, for example, of the rgb colors, the beams of three rgb lasers or of one laser with a three-color rgb emission are coaxially adjusted with respect to an identical beam axis. During a joint scanning and luminating of the screen and of the hologram with the reference beam, the three colors are simultaneously on the real video screen. The reference beam also represents a superimposition of three rgb partial beams.

This simultaneous recording of all three rgb colors in the same hologram naturally requires that the hologram material is photosensitive to all colors. However, this also applies to a number of photopolymers and silver halide films as well as to individual dichromate gelatins.

For recording the video screen holograms described here with a rapidly pulsed rgb illumination, modern diode-pumped, q-switched infrared solid-state lasers are used with an emission in only one longitudinal resonator mode. The lasers are adjusted to the rbg emission at the suitable rgb wavelengths by a classical frequency conversion, such as frequency doubling, optically parametric processes and summation and difference frequency formation, in various non-linear crystals.

Separate lasers can be used for the individual colors, but it is more advantageous to use lasers which have a single joint q-switched laser oscillator. The lasers have joint amplifier stages on the output side and a joint optical-parametric oscillator which splits the fundamental wave of the laser or its frequency-doubling wave into two partial waves of a longer wavelength (idler and signal wave). A subsequent beam separation is used for separating the primary radiation into different beam branches, where different further frequency conversions take place, such as frequency doubling, frequency summation and difference formation for producing the individual colors.

A significant advantage of such a joint primary laser is the fact that the emission of all three rgb color branches takes place completely synchronously with the same pulse repetition frequency, in a solid phase and with a comparable spectral width, coherence length and beam divergence. This permits a joint recording of the video screen holograms simultaneously in all colors.

RGB lasers, which are based on this basic concept of a joint primary laser with a subsequent frequency conversion in passive non-linear crystals to the three rgb colors, are described, for example, in the above-mentioned German Patent Document DE 195 04 047, "Laser System for Color Image Projection", and in German Patent Document DE 44 32, 029, "Laser-Supported Color Image Display and Projection Device". The diode-pumped solid-state lasers described there are operated in the mode-locked continuous-wave mode. However, with respect to the recording of video screen holograms, they have the disadvantage that they emit a wide frequency spectrum of individual longitudinal modes, that is, of a short coherence length in the primary emission as well as after the frequency conversion.

Figure 6:
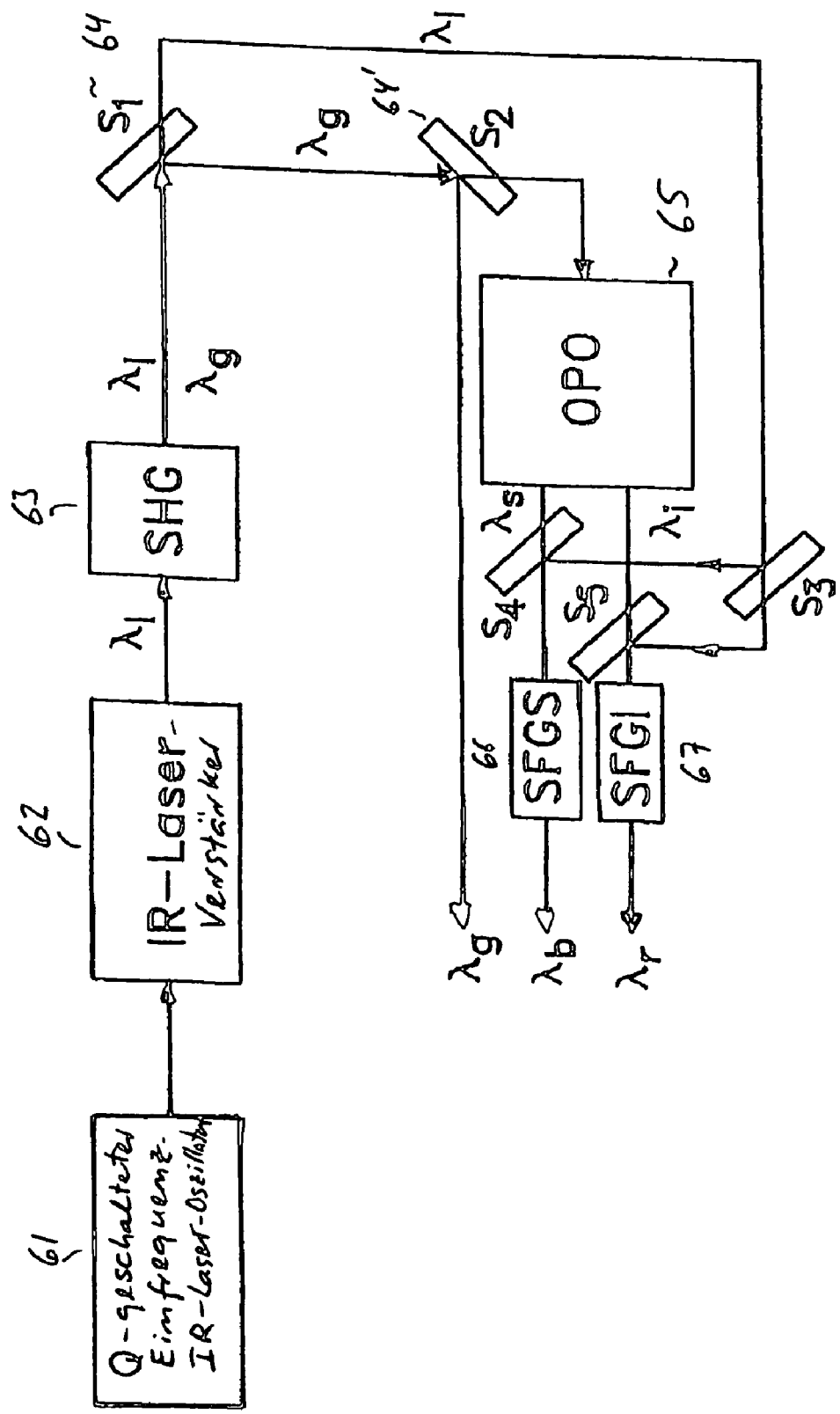
FIG. 6 is a schematic view of a laser system according to the invention.

FIG. 6 illustrates a laser according to the invention which is particularly suitable for the above-described pulsed video screen hologram recordings. In this case, instead of a mode-locked laser, a rapidly pulsed q-switched single-frequency IR oscillator 61 of an Nd laser, such as Nd:YLF, Nd:YAG or Nd:YVO, is provided; that is, the oscillator 61 has a single longitudinal mode. The power amplification of the pulses takes place in a solid-state laser amplifier 62 of the same materials. An optical parametric oscillator 65 is provided for subsequent frequency splitting. This oscillator can be adjusted in its wavelength by way of the temperature of the non-linear material and/or the adjustment of the axis angle in the beam path. As a result, the wavelength of the effective rgb radiation can also be adjusted during the subsequent frequency conversion. This is advantageous for precisely adapting the recording wavelength to the later reproduction wavelength. A frequency doubling and summation frequency formation also takes place. The oscillator 61, is a q-switched Nd:YAG in the longitudinal single-mode operation. The laser amplifier 62 is an Nd:YAG or Nd:YVO amplifier chain. Furthermore, a frequency doubler crystal 63 is provided as well as beam separators 64, 64' for separating the fundamental radiation of the primary laser $\lambda_f$=1.06 $\mu$m from the frequency-doubled green radiation $\lambda_g$=0.53 $\mu$m. The optical parametric oscillator 65 is pumped by means of the green beam $\lambda_g$ and adjusted such that it generates two signal and idler beams ($\lambda_s$ and $\lambda_i$ respectively), which have a suitable wavelength for a subsequent summation frequency formation in summation frequency generators 66, 67. In this case, the wavelengths $\lambda_s$ and $\lambda_i$ are selected such that the summation frequency formation with the beams of the fundamental wavelength of the laser $\lambda_f$=1.06 $\mu$m (or 1.04 $\mu$m), which remains after the frequency doubling, results in suitable wavelengths of red and blue. In contrast, the color green is taken over as part of the frequency-doubled radiation of the primary laser by way of splitting by the simple beam separator 64, 64'.

The suggested rapidly pulsed q-switched laser 61 is a continuous-wave laser oscillator with only one longitudinal fundamental mode which is operated in a pulsed operation of the resonator. A laser of this type is, for example, a diode-pumped solid-matter microchip laser, such as the Nd:YAG at a laser wavelength 1.06 $\mu$m with such a short resonator that it starts lasing only on a longitudinal mode. By means of an internal passive quality switch, for example, made from the known $Cr^{4+}$:YAG material, the resonator can be adjusted by doping with $Cr^{4+}$ ions, for example, to 20 kHz pulse frequency with a pulse duration of 10 ns.

The IR-emission of the laser 61 is now highly amplified in the amplifier 62 which follows; for example, by means of the crystal Nd:YAG or Nd:YVO, by a factor 10–100, without creating interfering higher longitudinal modes, also while maintaining the good beaming quality of the oscillator. After the amplification, the pulsed beam is then still frequency-doubled to the desired green wavelength 532 nm, which occurs here in a KTP crystal 63. After the frequency doubling, which takes place here with an efficiency of approximately 30%, a portion of the primary radiation with a wavelength of 1.06 $\mu$m remains for a further use in the subsequent stages.

A second possibility is the use of passively quality-switched Nd:YAG ring lasers with the same $Cr^{4+}$ YAG quality switch, a similar pulse repetition frequency, but a better frequency stability and a higher median power. By means of subsequent amplifier stages as in the previous case, a median power of 10–39 W can be generated in a longitudinal mode.

One possibility is the use of a laser actively quality switched by means of an acoustic-optical switch with an internal standard for adjusting a single-mode operation. This arrangement, however, requires slightly higher expenditures in comparison to the second process.

Q-switched continuous-wave lasers of the type described here have a pulse repetition frequency of 10–20 kHZ, a pulse width of 5–20 ns and a frequency bandwidth of the laser emission below 100 MHz. They can be designed with an amplifier stage such that, after the frequency doubling 1 W green emission is created, and by means of two or three stages, up to 10 W green radiation is generated and 30 W infrared radiation is generated in the device. After the conversion in the optical parametric oscillator 65 and a further frequency doubling or summation frequency formation, all rgb beams can then be produced with a median power of several watts. A significant advantage of this concept is also that the colors blue and red can be continuously displaced by the adjustment of the wavelengths of the idler and signal wavelength $\lambda_s$, $\lambda_i$ in the optical parametric oscillator 65 for the adaptation to the wavelength of the later image projection lasers.

By means of the characteristic laser data, such laser systems are particularly suitable for the recording of the video screen holograms. If, for example, the pulse duration of the laser amounts to 10 ns and the scanning rate amounts to 5 m/sec, the beam moves laterally by $5\times10^{-8}$ m during this pulse duration, which corresponds to $\frac{1}{10}$ of the wavelength at, for example, 500 nm. This small displacement has no noticeable influence on the quality of the interference pattern in the hologram. If the pulse frequency were, for example, 20 kHz, the beam would move from pulse to pulse at this scanning rate by $\frac{1}{4}$ mm. The coherence length of a $\Delta t$=10 ns single-mode pulse amounts to approximately $\Delta t$ c=3 m, wherein c is the speed of light. The difference of the travelling paths of the object and reference beam must not exceed this value, which can easily be observed in the case of all suggested embodiments of the holograms.

Therefore, video screen holograms can be designed either for a front projection as a reflection hologram, or for a rear projection as a transmission hologram. Recording in both the contact process with the real video screen and as an image plane hologram (that is, after an imaging of the video screen on the hologram, as illustrated above) are suitable for both processes. In all cases, the object beam and the reference beam are moved synchronously over the hologram.

Only light sources with an identical linear polarization can interfere with one another and be stored as a holographic image of screens in a hologram; that is, only light waves of an identical linear polarization in the reference beam and the object beam can contribute to generating the image of the video screen. Therefore, the lasers used for the recording of the holograms are preferably polarized in a strictly linear manner in order to ensure the efficiency and the homogeneity of the illumination over the entire hologram surface. Since most lasers with a good beaming quality are strictly linearly polarized from the start, this does not cause any limitation of the recording technique.

For recording of video screens for stereoscopic image reproduction, video screen materials are used which depolarize an impinging linearly polarized light beam by back-scattering or by forward scattering. This applies to many projection screen materials for the rear projection with a good fine roughness of the surface or a slight volume scattering, and to almost all projection screens with a high volume scattering for rear projections. Since the reference beam also has a strict polarization direction of the laser, when a real video screen is recorded, this polarization direction is maintained in the hologram. If now two recordings are successively made of the same screen, in which the polarization direction of the reference beam is rotated from one to the other by 90°, two independent screen images are created in the same video screen hologram, each being effective only with respect to a projection beam with a defined polarization direction. Both screen images affect mutually orthogonal polarized projection beams. Thus, also prerequisites are met for the projection of mutually orthogonally polarized stereo images and their stereoscopic viewing by means of polarization glasses.

The switch-over of the polarization by 90° in the reference beam can be carried out very simply by rotating a $\lambda/2$-plate in the beam path behind the outlet aperture of a strictly linearly polarized illumination laser.

If several video screen recordings are made of the same screen successively into the same hologram while the site of the whole screen or of the place of origin of the reference beam are changed, the interfering speckle images are superimposed coherently with a statistical size distribution. Together, they represent a new virtual screen after the luminations, which screen has a significantly higher fine structure than the real original screen. This results in a displacement of the entire appearance image toward larger speckles which then, during the subsequent image reproduction, can be eliminated more easily by a slight local or time-related modulation of the projection beams. Therefore this technique utilizes the ability of holograms to store several images with slightly changed recording condition above one another but independently of one another in the same hologram. Also in the case of video screen holograms which are recorded by means of pulsed lasers, the size of the interfering image speckles which occur during the image reproduction by means of lasers can therefore be changed.

The method described here of recording a scattering holographic video screen can also be used for recording the function of a plane mirror which basically represents only a borderline case of a scattering surface. Because of their selectivity in the wavelength, such holographic mirrors can advantageously be used as auxiliary elements in the recording devices or in the projectors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a video screen hologram for forming a projected video image thereon, said video screen hologram being formed as a holographic image of a real video screen by illuminating the real video screen with narrowband light to generate a hologram of the real video screen, said method comprising:
   making a plurality of individual recordings by sequentially illuminating a plurality of different partial areas of the real video screen; and
   forming a video screen hologram of the entire video screen by a composition of the individual recordings; wherein
   illumination of the video screen is performed by guiding a scanning pulsed laser beam over the video screen; and
   the video screen hologram is one of a contact hologram and an image plane hologram, whereby during reconstruction of said holographic image of a real video screen, said projected video image appears in a hologram plane of said video screen hologram.

2. The method according to claim 1, wherein pulse duration of the scanning pulsed laser beam is dimensioned such that the movement of the laser beam over the video screen has substantially no effect on interference of the light waves in the hologram.

3. The method according to claim 2, wherein a scanning rate and a pulse duration of scanning pulsed laser are mutually coordinated such that the movement of the laser beam during a pulse is smaller than $\frac{1}{10}$ of the wavelength.

4. The method according to claim 1, wherein each of the partial areas of the video screen has a size that corresponds to an image pixel.

5. The method according to claim 1, wherein the lumination takes place by means of a pulsed diode-pumped solid-state continuous-wave laser.

6. The method according to claim 1, further comprising performing a frequency conversion of said laser beam in one or several of the wavelength ranges red, green, blue.

7. The method according to claim 1, wherein a transmission hologram or a reflection hologram is produced.

8. The method according to claim 1, wherein laser beams of a coherence length are generated which is greater than a difference between light paths of the object beam and the reference beam.

9. The method according to claim 1, wherein a repeated scanning of the video screen surface takes place by means of a respectively phase-shifted laser beam.

10. The method according to claim 1, wherein distribution of the rumination in the hologram is measured to correct rumination in a subsequent lumination cycle.

11. The method according to claim 1, wherein plural luminations are carried out with mutually perpendicularly polarized energy beams to produce two mutually independent screen images in the hologram.

12. The method according to claim 1, wherein optical characteristics of said real video screen are stored in said video screen hologram.

13. A video screen hologram for forming a projected video image therein, said video screen hologram comprising a holographic recording material in which a holographic image including optical characteristics of a real video screen is stored as a hologram, wherein:
   the video screen hologram comprises a plurality of individual recordings, in each of which a different partial area of the real video screen is imaged as a hologram, an entire image of the whole video screen resulting from assembled or superimposed individual recordings;
   the individual recordings are generated by sequentially illuminating said different partial areas of the video screen by means of a scanning pulsed laser beam;
   the video screen hologram is one of a contact hologram and an image plane hologram, whereby during reconstruction of said holographic image including optical characteristics of a real video screen, said projected video image appears as an image on said video screen hologram in a hologram plane thereof.

14. A video screen hologram for forming a projected video image therein, said video screen hologram comprising a holographic recording material in which a holographic image including optical characteristics of a real video screen is stored as a hologram, wherein:

the video screen hologram comprises a plurality of individual recordings, each of which contains a holographic image of a different partial area of the real video screen;

an entire image of the whole video screen is formed from assembled or superimposed individual recordings; and the video screen hologram is one of a contact hologram and an image plane hologram, whereby during reconstruction of said holographic image including optical characteristics of a real video screen, said projected video image appears as an image on said video screen hologram in a hologram plane thereof.

15. A method of generating a video screen hologram, comprising:

illuminating a real video screen with narrow band light by successively illuminating different partial areas of the real video screen;

recording a plurality of individual holographic images in a recording medium, each of which covers only a single one of said different partial areas of the real video screen, said individual holographic images collectively covering the entire real video screen; and forming a composite of said individually recorded holographic images to generate a video screen hologram of the entire real video screen;

wherein illumination of the video screen is performed using a scanning pulsed laser beam.

16. A method of displaying a video image, comprising:

recording a holographic image of a physical object comprising the entirety of a video projection screen, in a holographic recording medium, to create a hologram;

reconstructing said recorded holographic image from said hologram to form a visually observable representation of said video projection screen;

projecting said video image onto the visually observable representation of said video projection screen, whereby said video image appears to be projected onto said video projection screen;

wherein said hologram comprises a composition of holographic images of a plurality of different partial areas of said video projection screen, which partial areas collectively comprise substantially the entirety of the video projection screen.

17. Video image display apparatus, comprising:

a hologram having stored therein a holographic image of a physical object comprising the entirety of a video projection screen;

means for reconstructing said holographic image of said video projection screen to form a visually observable representation thereof; and means for projecting said video image onto said visually observable representation, whereby said video image appears to be projected onto said video projection screen;

wherein said hologram comprises a composition of holographic images of a plurality of different partial areas of said video projection screen, which partial areas collectively comprise substantially the entirety of the video projection screen.

* * * * *